(12) United States Patent
Austrheim et al.

(10) Patent No.: US 12,258,209 B2
(45) Date of Patent: Mar. 25, 2025

(54) AUTOMATED STORAGE SYSTEM WITH FRAMEWORK MOUNTED MODULAR PLATE SYSTEM AND BRACING ARRANGEMENT

(71) Applicant: Autostore Technology AS, Nedre Vats (NO)

(72) Inventors: Trond Austrheim, Etne (NO); Børge Bekken, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 232 days.

(21) Appl. No.: 17/792,275

(22) PCT Filed: Feb. 1, 2021

(86) PCT No.: PCT/EP2021/052301
§ 371 (c)(1),
(2) Date: Jul. 12, 2022

(87) PCT Pub. No.: WO2021/152170
PCT Pub. Date: Aug. 5, 2021

(65) Prior Publication Data
US 2023/0048613 A1    Feb. 16, 2023

(30) Foreign Application Priority Data

Jan. 31, 2020  (NO) .................................. 20200118

(51) Int. Cl.
*B65G 1/06*        (2006.01)
(52) U.S. Cl.
CPC .................................... *B65G 1/065* (2013.01)
(58) Field of Classification Search
CPC ....... B65G 1/065; B61D 15/00; E04B 1/2403; E04B 1/5831; E04H 12/10; E04H 12/22
See application file for complete search history.

(56) References Cited

U.S. PATENT DOCUMENTS 5,219,406 A * 6/1993 Raz ...................... E04B 2/7425
                                                               403/252
6,298,612 B1   10/2001 Adams
(Continued)

FOREIGN PATENT DOCUMENTS

CN        202000724 U    10/2011
CN        102884358 A     1/2013
(Continued)

OTHER PUBLICATIONS

International Search Report issued in Application No. PCT/EP2021/052301 mailed on May 10, 2021 (3 pages).
(Continued)

*Primary Examiner* — Paola Agudelo
(74) *Attorney, Agent, or Firm* — Baker Botts L.L.P.

(57) ABSTRACT

An automated storage and retrieval system includes a framework structure constructed of a plurality of upright members connected by horizontal members to define a storage grid of storage columns, within which storage columns may be stacked a plurality of storage containers. The framework structure has a rail system arranged at the upper level of the framework structure, with parallel rails in a first direction and parallel rails in a second direction perpendicular to the first direction, upon which rails a plurality of wheeled container handling vehicles travel. The container handling vehicles are equipped with a gripping and lifting device for removing storage containers from the storage columns and replacing the storage containers in the storage columns. The upright members of the framework structure have corner sections directed towards an interior of a particular storage column. The corner sections include two vertically elongated, perpendicular corner guiding plates. The corner guiding plates of the upright members are proximate to a storage column forming a guide for corners of the storage containers stored in that storage column A bracing system includes a
(Continued)

plurality of plate members mounted between adjacent upright members. The bracing plate members include a plate segment removably mounted between two retaining profiles. Each retaining profile has a shape adapted to engage an upright member. The retaining profiles of the plate members have a box shape adapted to be securely inserted between and essentially occupy the space between the corner guiding plates of two adjacent corner sections of an upright member. A plate segment of plate member is arranged to be connected to a flange of the inserted retaining profiles. The bracing plate members are arranged to provide structural support stability for the framework structure. The guiding plates have inwardly projecting ribs that engage corresponding grooves of the retaining profiles by snap fit.

11 Claims, 16 Drawing Sheets

(56) References Cited

U.S. PATENT DOCUMENTS

| | | | |
|---|---|---|---|
| 9,004,715 B1* | 4/2015 | Litke | A47F 3/001 |
| | | | 362/218 |
| 2008/0110127 A1* | 5/2008 | Terada | E04C 3/06 |
| | | | 52/646 |
| 2009/0107943 A1* | 4/2009 | Konstant | B65G 1/02 |
| | | | 52/690 |
| 2012/0298600 A1* | 11/2012 | McCarthy | B65G 1/02 |
| | | | 211/49.1 |
| 2013/0034383 A1 | 2/2013 | Chong | |
| 2014/0326685 A1* | 11/2014 | Frazier | A47F 13/00 |
| | | | 220/571 |
| 2016/0369941 A1* | 12/2016 | Consaul | B65G 1/02 |
| 2018/0235364 A1* | 8/2018 | McGhee, III | A47B 87/008 |
| 2018/0370725 A1* | 12/2018 | Hognaland | B65G 1/0457 |
| 2020/0148471 A1* | 5/2020 | Lindbo | B65G 1/0478 |
| 2020/0324976 A1* | 10/2020 | Diehr | B65G 1/0492 |
| 2021/0137264 A1* | 5/2021 | French | A47F 7/00 |
| 2022/0081209 A1* | 3/2022 | Cristescu | G06K 19/041 |

FOREIGN PATENT DOCUMENTS

| | | |
|---|---|---|
| CN | 203769059 U | 8/2014 |
| CN | 203769061 U | 8/2014 |
| CN | 203769063 U | 8/2014 |
| CN | 104641052 A | 5/2015 |
| CN | 205179583 U | 4/2016 |
| CN | 109629712 A | 4/2019 |
| NO | 317366 B1 | 10/2004 |
| WO | 2014/075937 A1 | 5/2014 |
| WO | 2014/090684 A1 | 6/2014 |
| WO | 2015/193278 A1 | 12/2015 |
| WO | 2016172793 A1 | 11/2016 |
| WO | 2018/146304 A1 | 8/2018 |
| WO | 2019/094511 A1 | 5/2019 |
| WO | 2019/101367 A1 | 5/2019 |

OTHER PUBLICATIONS

Written Opinion issued in Application No. PCT/EP2021/052301 mailed on May 10, 2021 (9 pages).
Norwegian Search Report issued in Patent Application No. 20200118 (2 pages).
T. Yuhong, Notification of the First Office Action, Mar. 31, 2024, 17 pages, pub. by SIPO, Beijing, China.
Marko Peltonen, Office Action for Norwegian U.S. Appl. No. 20/200,118, dated Jan. 21, 2025, 1 page, pub. by the Norwegian Industrial Property Office, Oslo, Norway.

* cited by examiner

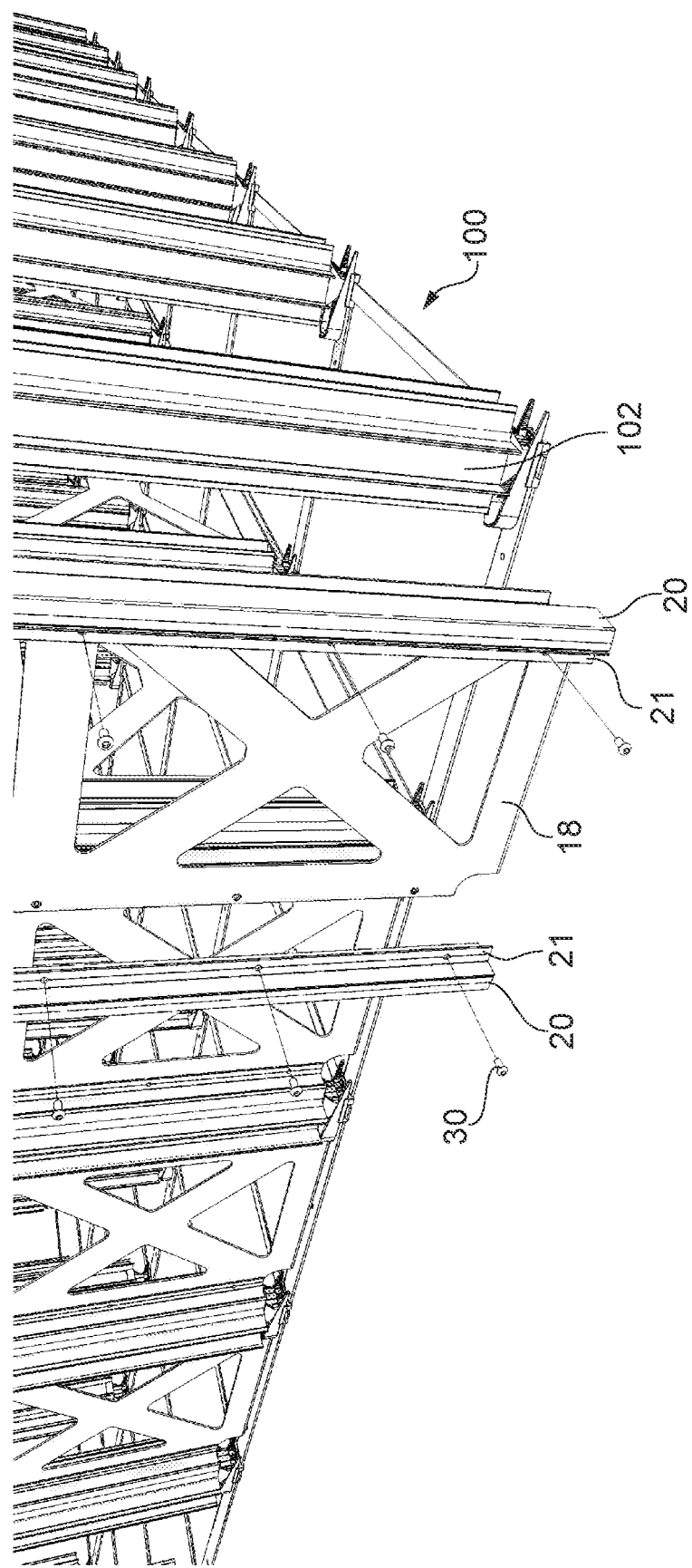

AUTOMATED STORAGE SYSTEM WITH FRAMEWORK MOUNTED MODULAR PLATE SYSTEM AND BRACING ARRANGEMENT

FIELD OF THE INVENTION

The present invention relates to an automated storage and retrieval system for the storage and retrieval of containers, in particular to arrangements for stabilizing a framework structure of such a storage and retrieval system.

BACKGROUND AND PRIOR ART

Automated Storage and Retrieval Systems Generally

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

Stability of the Framework Structure of a Storage and Retrieval System

The framework of an automated storage and retrieval system as described above must of course be able to support the weight of the framework itself, together with the combined weight of the storage containers and their contents, the container handling vehicles and other equipment of the system. In addition, the framework must also be able to withstand lateral forces, for example caused by the acceleration and braking of the vehicles, uneven weight distribution, earthquake and the like.

Prior art storage systems have employed various arrangements to ensure sufficient stability of the framework structure 100. In some installations, the framework structure is connected to and supported by the walls of the building in which the storage system is housed. Where this is not possible, the prior art storage systems may dependent on an auxiliary supporting structure (not shown) constructed at least partly along the periphery of the framework structure 100. The requirement of having an auxiliary supporting structure is disadvantageous for a number of reasons. The supporting structure occupies space/area which could otherwise be utilized by the storage system, i.e. it prevents optimum use of available space/area for storage; the need of an auxiliary supporting structure may limit the available options for positioning of the storage system, i.e. the auxiliary supporting structure may prevent the optimum positioning of the storage system since the auxiliary supporting structure itself often requires connection to a surrounding structure, such as the inner walls of a building; and the requirement of a supporting structure is not cost efficient.

In another example from the prior art, the present applicant has previously described in WO 2019101367 a system of inclined supporting struts connected to the upright members 102 of the framework structure. While the struts from WO 2019101367 provide stability and allow the framework structure to be self-supporting, there is room for improvement in providing a simpler and more flexible arrangement for stabilizing the framework structure 100. The solution described in WO 20191010367 does not provide a modular system where functional plate members can be installed that perform various functions.

One particular disadvantage for the arrangement described in WO 2019101367 is that installation of the struts depends upon a new and somewhat more complicated profile of the upright members 102 of the framework structure. In the prior art storage system described above, four proximate upright members 102 of the framework structure 100 define a storage column 105. The upright members themselves are hollow, extruded aluminum profiles. The upright members have four corner sections 8, each of which having two perpendicular container-guiding plates 9. When in use, corners 11 of the containers slide upward and downward along the storage column 105, guided by the corner sections 8 of the upright members. In order to install its stabilizing struts however, WO requires a groove or ridge in the space between container guiding plates 9, to which an attachment device for the struts are connected. This requirement for a more complicated profile for the upright members increases cost and prohibits the use of the struts in existing installations.

There is a need, therefore, for a modular arrangement that can stabilize the framework structure of a storage system (as well as providing a modular system to create functional zones in the framework structure of a storage system) that is an improvement on the arrangement described in WO 2019101367 by being compatible with the simpler profile of the upright members 102 of existing prior art storage system installations as described above.

Another example of the prior art is WO2016/172793. This application describes a storage and retrieval system comprising a framework structure defining storage columns in which are stacked storage containers. An empty column is arranged adjacent to one of the four sides of a storage column. A containing-retrieving vehicle travels up and down the empty column and removes storage containers sideways from the adjacent side of the storage column. The application describes panels installed along the three other faces of the storage column, said panels being described as providing structural stability for the framework. Each of the panels has an inward facing lip, such that three panels of a given vertical level of the column form a shelf on which a container rests and from which the container is removed sideways by the vehicle. Since the lips of the panels form the shelves on which the containers rest, the panels in WO2016/172793 must be installed as part of the original construction of the framework. The panels likewise cannot be removed or replaced while containers are arranged in the storage columns, and WO2016/172793 does not offer a modular system where functional panels can be installed at various locations in the framework to create functional ones, as the supporting panels of WO2016/172793 must be at every storage column.

SUMMARY OF THE INVENTION

The present invention is set forth and characterized in the independent claims, while the dependent claims describe other characteristics of the invention.

According to one aspect, the invention is a modular plate system where plate members of various functions can be easily inserted between the upright members of the framework structure of a storage and retrieval system as described above.

In another aspect, the modular plate system of the invention may function as a stabilizing arrangement for the framework structure. According to this aspect of the invention, the plate members of the system are bracing plate members that may be connected between adjacent upright members 102 of a framework structure 100 as described above in order to provide structural stability for the framework.

In another aspect, the plate members may provide some function other than or in addition to stabilization, for example, the functional plate members may be thermally insulated plates, fire barrier plates, sound insulated plates and the like, whereby the plates may be used to form zones or barriers in the framework, for example for forming a refrigerated zone, a sound insulated zone or a fire barrier wall for creating a fire protected zone. The plates may be easily installed and removed, allowing functional zones to be created, expanded or repurposed at will.

In another aspect the invention is directed to a method of stabilizing a framework structure of a storage and retrieval system.

In another aspect the invention is directed to a method of creating functional zones in a framework structure of a storage and retrieval system.

BRIEF DESCRIPTION OF THE DRAWINGS

Following drawings are appended to facilitate the understanding of the invention. The drawings show embodiments of the invention, which will now be described by way of example only, where:

FIG. 11 is a perspective exploded view illustrating the sides of the bracing plate members attached to the upright members.

DETAILED DESCRIPTION OF THE INVENTION

Figure 1:
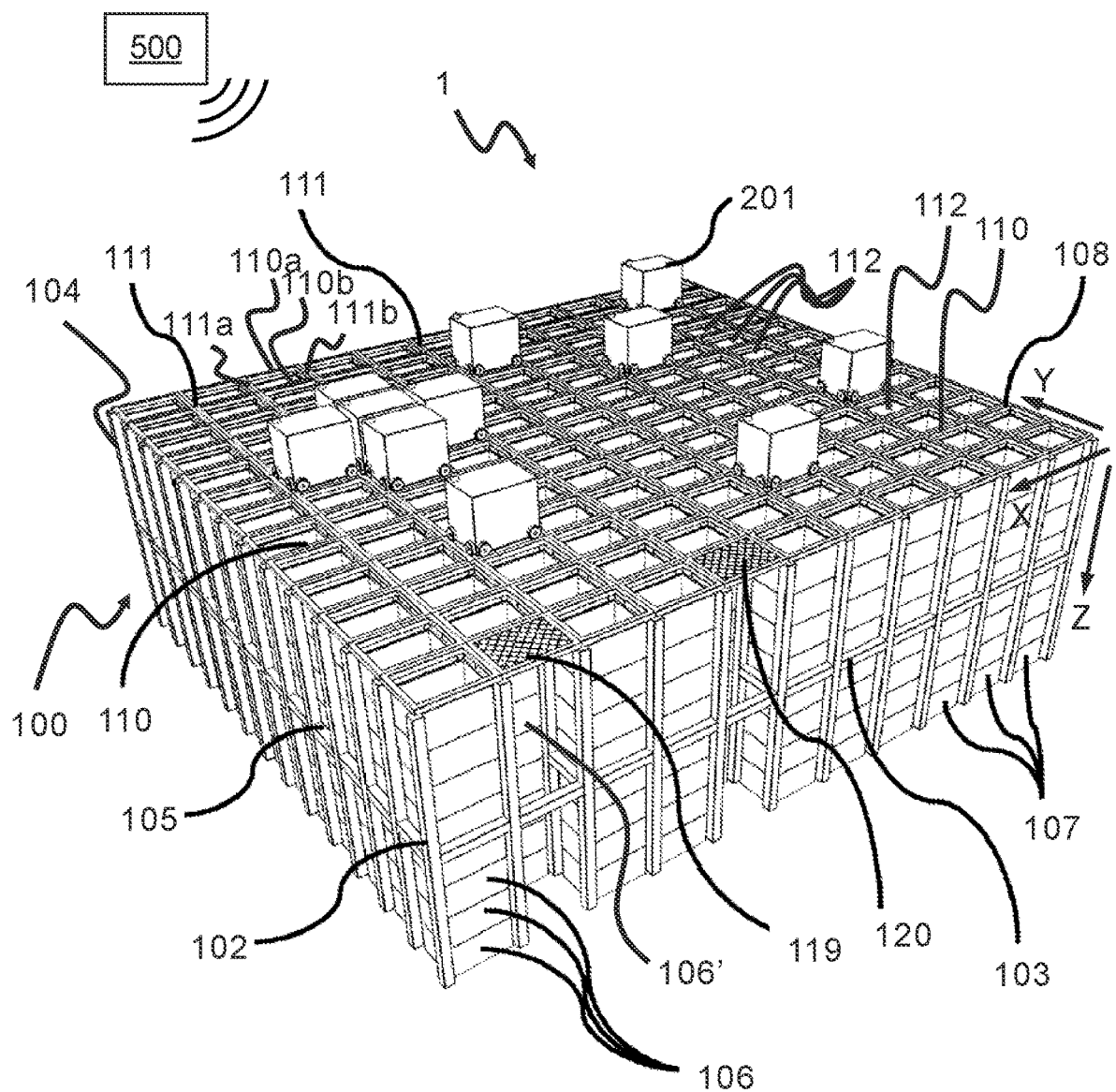
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
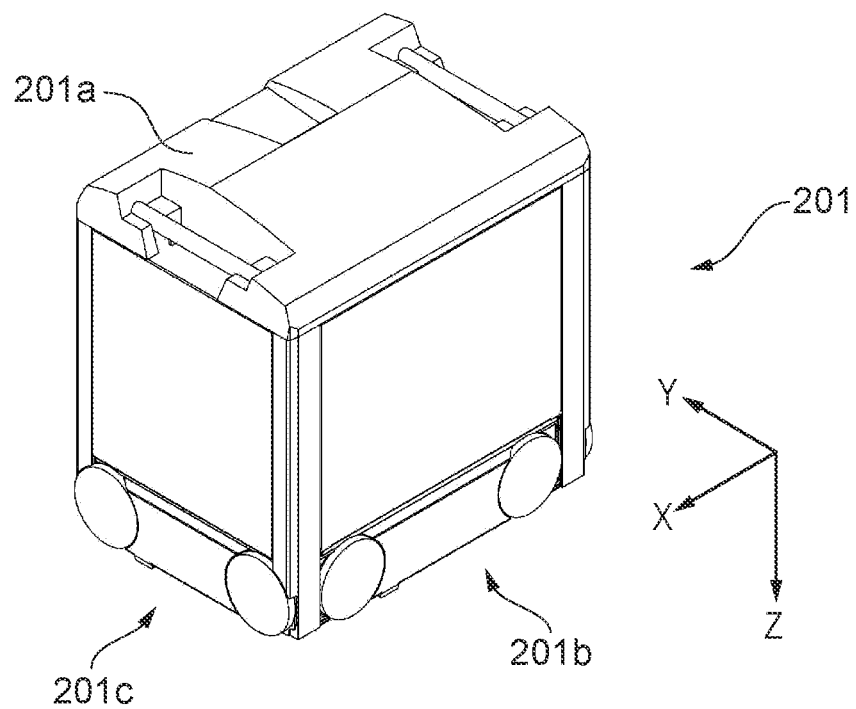
FIG. 2 is a perspective view of a prior art container handling vehicle having a centrally arranged cavity for carrying storage containers therein.
Figure 3:
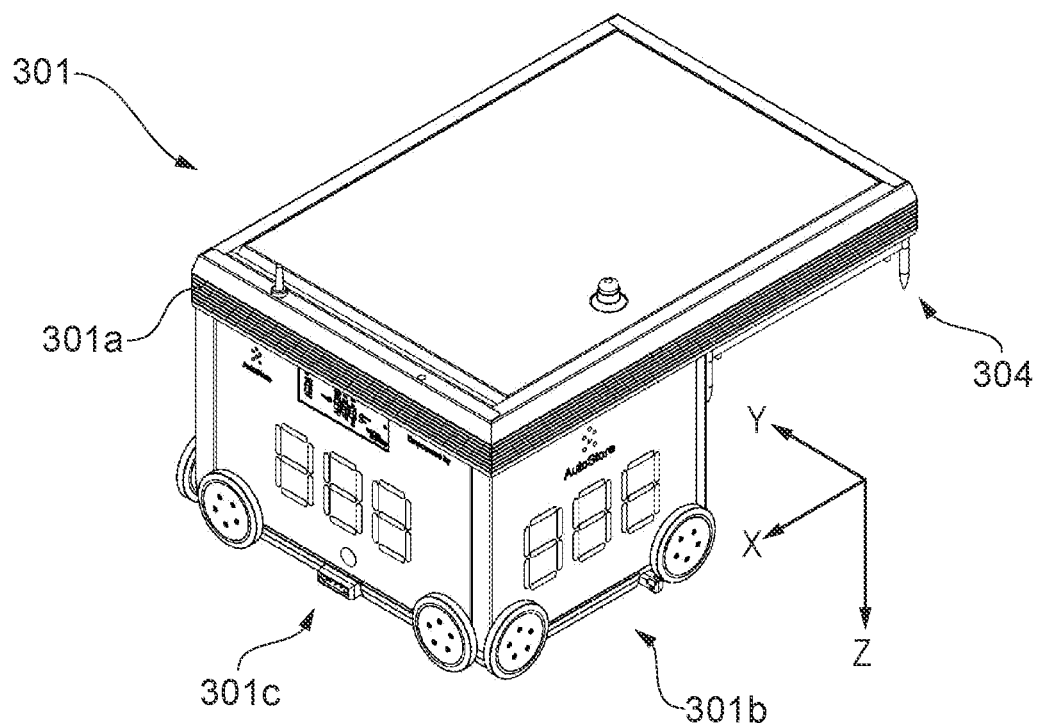
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

One embodiment of the automated storage and retrieval system as well as other aspects of the present invention will now be discussed in more detail with reference to FIGS. 4-14.

Figure 4:
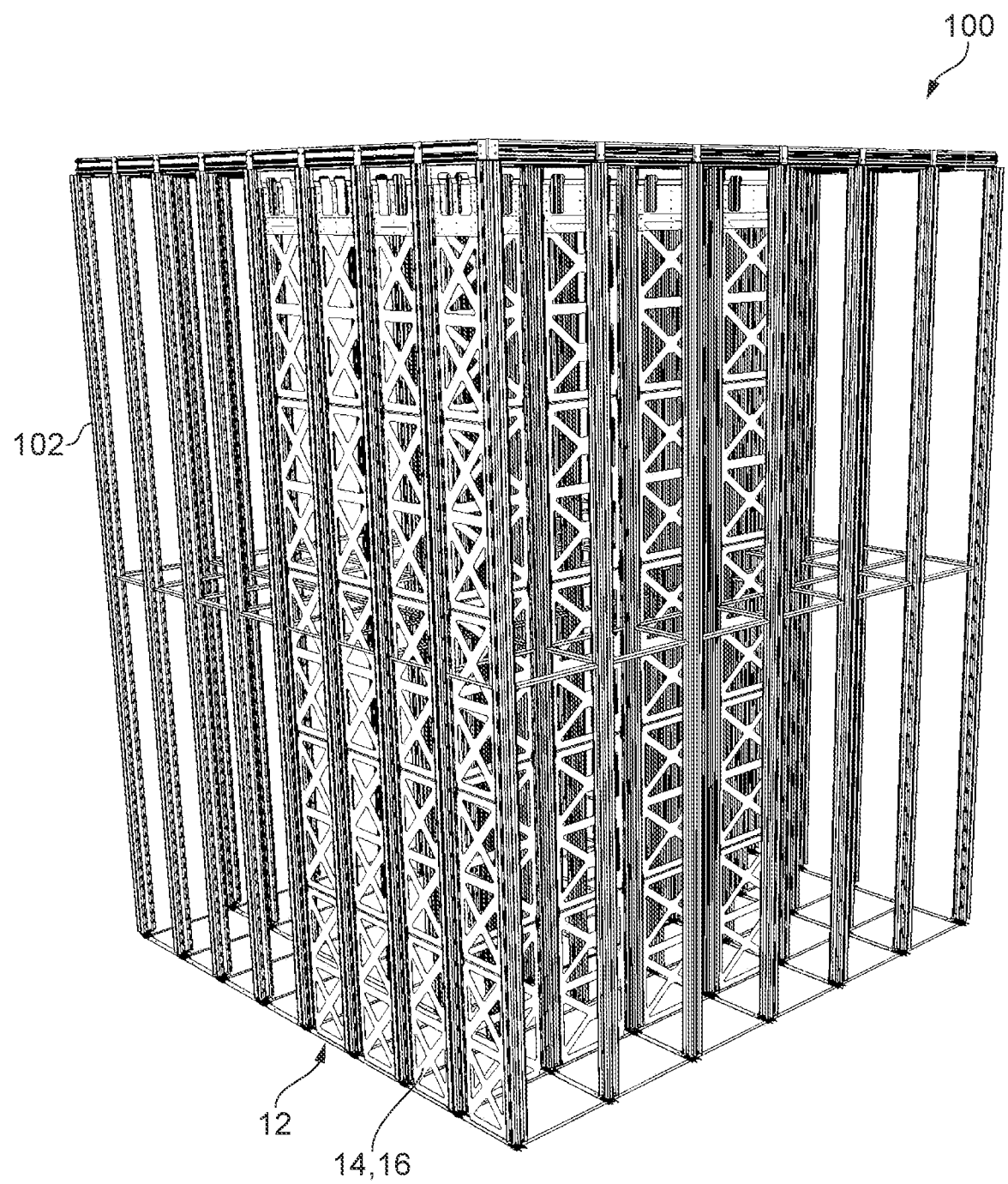
FIG. 4 is a perspective view of a framework structure an automated storage and retrieval system where a preferred modular plate system of the invention comprises bracing plate members that function as a stabilizing arrangement for the framework.
Figure 5:
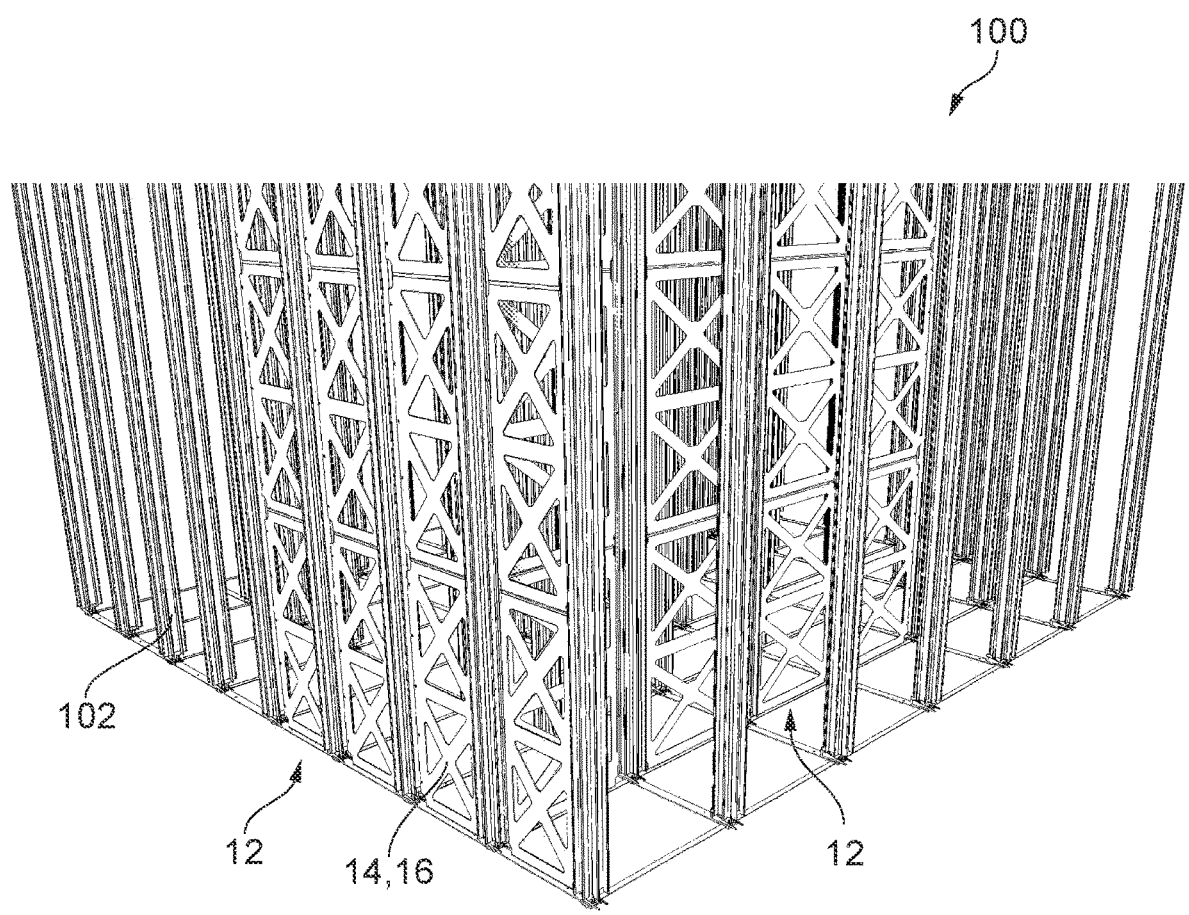
FIG. 5 is a detailed view from FIG. 4.

FIGS. 4 and 5 show a framework structure 100 comprising a plurality of upright members 102. FIGS. 4 and 5 further illustrate framework structure 100 with a modular plate system 12 comprising a plurality of plate members 14 installed between adjacent upright members 102. In the embodiment illustrated in FIG. 4-13, the plate members 14 are bracing plate members 16. The term "bracing plate" as used herein means a plate member with a shape and configuration, and made of a material, specifically intended to provide structural stability to the framework, whereby a plurality of such bracing plates can provide sufficient stability that the framework does not need to be censured to an external structure. A sufficient number and placement of bracing members is installed in order to provide structural stability for the framework structure. As illustrated, the bracing plate members may be installed along an outside row of upright members 102, or may be installed between upright members located in the interior of the framework structure.

Figure 6:
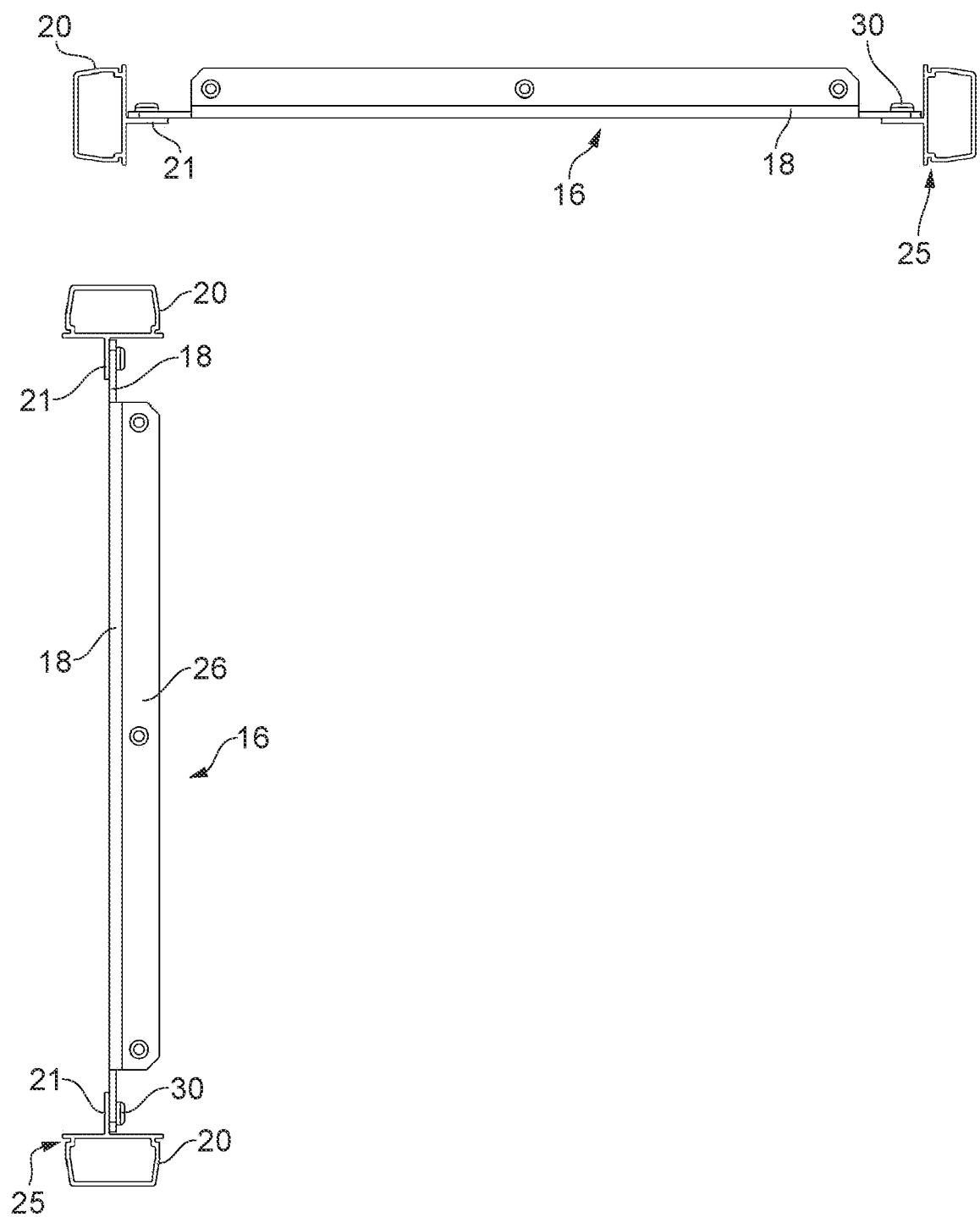
FIG. 6 is a cross sectional view of a preferred bracing plate member according to the invention.

FIGS. 6-13 illustrate bracing plate members 16 and the manner in which the plate members 14 in general are installed between upright members 102. As shown in FIG. 6 a plate member, in this instance a bracing plate member 16, comprises a plate segment 18 connected intermediate two retaining profiles 20. FIG. 11 shows the assembly of the plate segment to the retaining profiles in exploded view. As shown, retaining profiles 20 have a flange 21 to which plate segments 18 are connected, for example by bolts 30.

Figure 9:
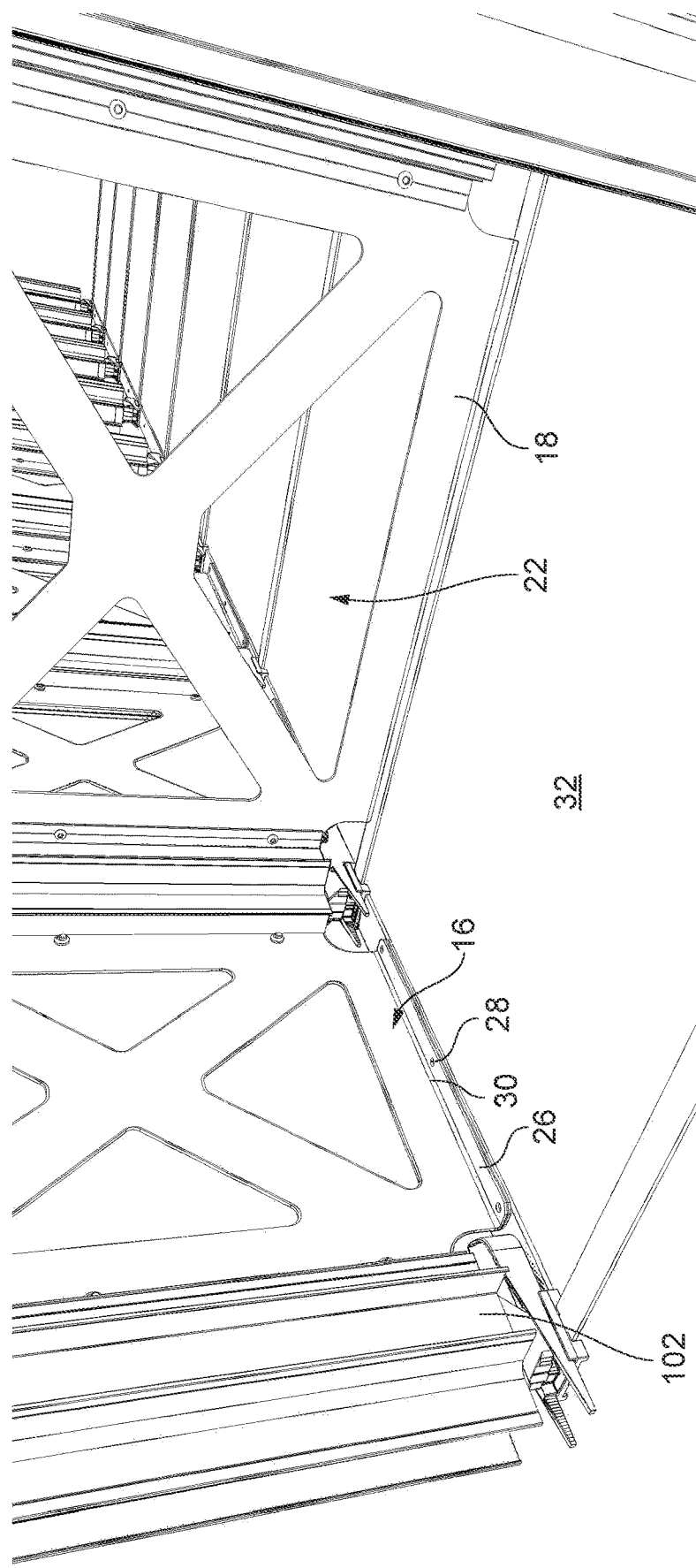
FIG. 9 is a perspective view showing the bottom of a bracing plate member attached to the bottom of the framework structure.

As shown in FIG. 9, plate segment 18, in the case of a bracing plate member 16, is a plate with preferably four essentially triangular cutouts 22 to form an X shaped pattern, although any shape that provides structural stability can be employed. Other examples of such shapes may be a plate with a plurality of circular cut outs, a plate in the shape of triangular struts, or a solid plate, however a plate with cutouts is preferred. Such cutouts reduce the weight of the plate segment, while the shape of the plate is designed to provide stability. For example the illustrated X shape is shown to provide excellent structural stability. The material of the plate segment 18 in the case of a bracing plate member 16 is preferably metal, most preferably aluminum. In the case where the plate member is a functional plate member, the plate segment 18 will be made of a material appropriate to the desired function. For example, a fire resistant plate member, and insulated plate member etc.

Figure 7A:
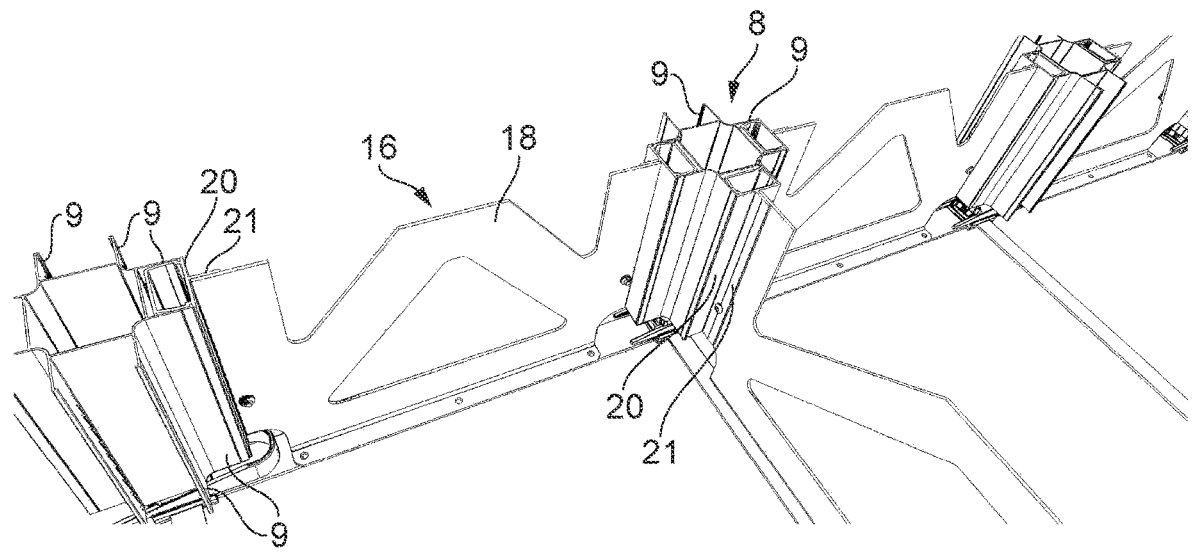
FIGS. 7A and 7B are cross sectional perspective views of a bracing plate member installed in the upright members of the framework structure.
Figure 7B:
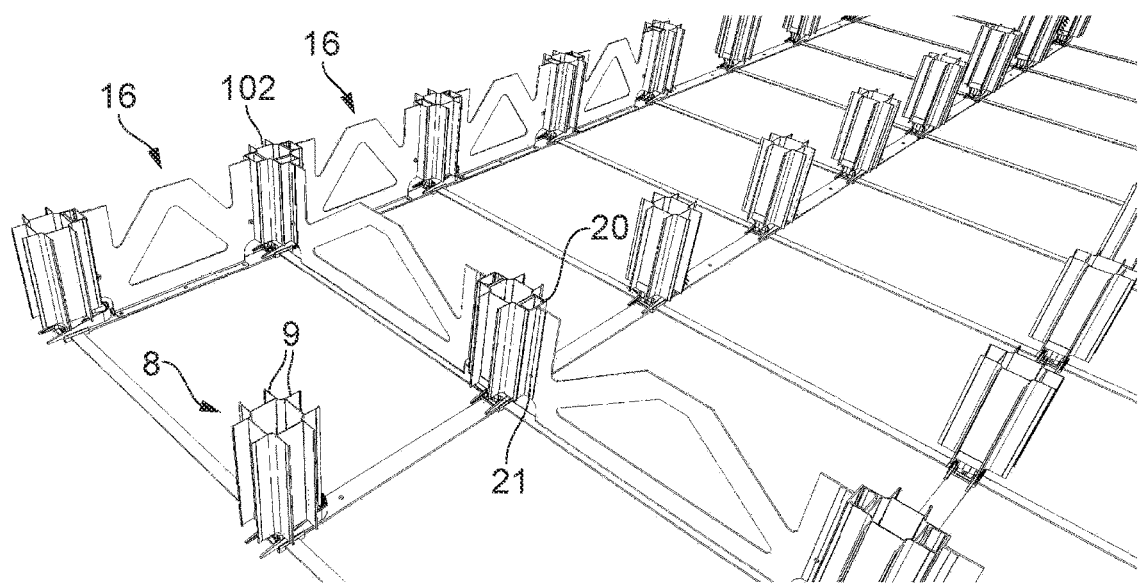
Figure 8:
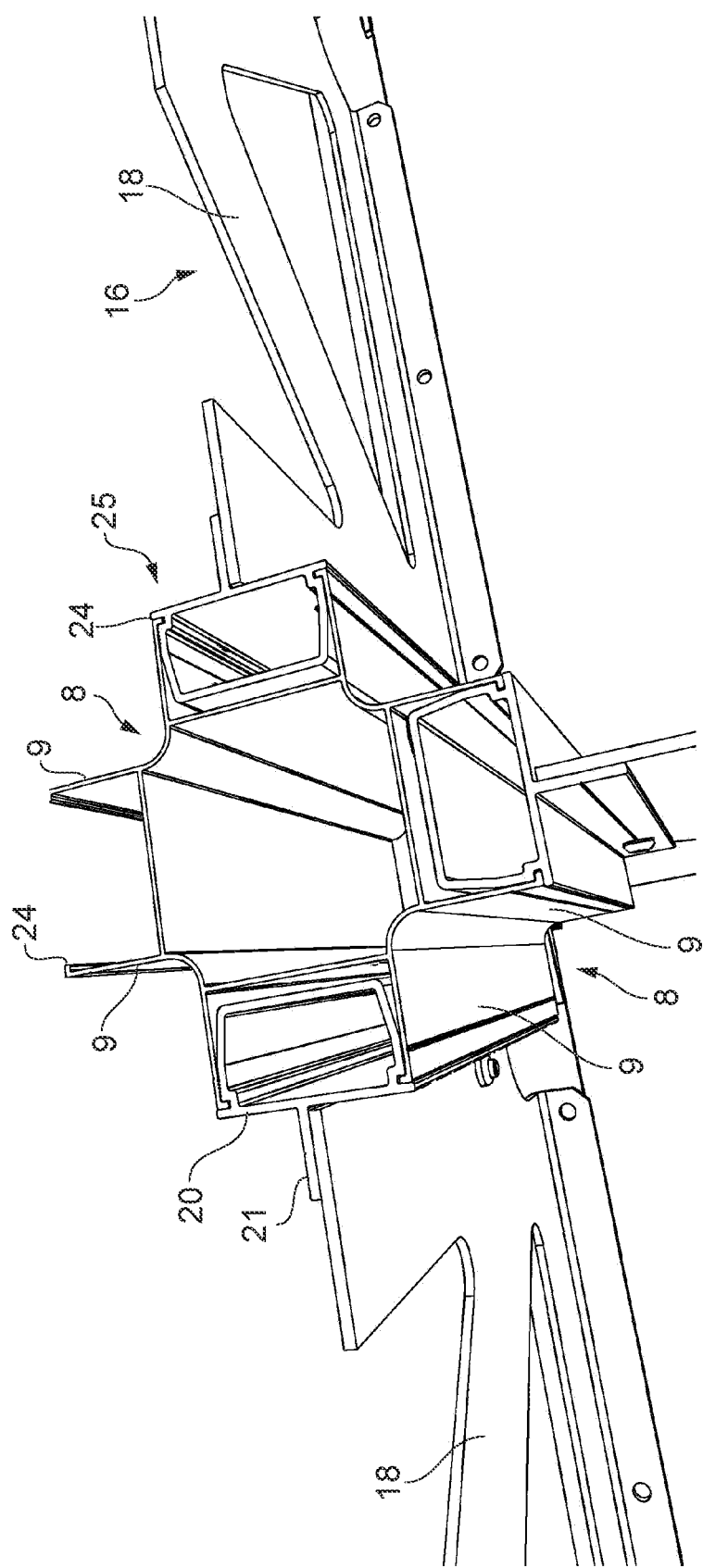
FIG. 8 is a detailed perspective view of retaining profiles of the plate members of the modular plate system inserted between adjacent container guiding plates of the upright members.

Retaining profiles 20 are preferably extruded aluminum profiles having a length equal to all of, or at least part of the length of the sides of the plate segment 18. Retaining profiles 20 have a cross sectional shape adapted specifically to fit between two adjacent container guiding plates 9 of corner sections 8, as shown in FIGS. 7A, 7B and 8. In one embodiment, upright members 102 are extruded aluminum profiles having a box shape that fits securely and essentially occupies the space between corner guiding plates 9, with corner guiding plates 9 being relatively thin extruded aluminum having a degree of flexibility whereby they may be slightly spread apart to permit insertion of retaining profiles 20. In one embodiment guiding plate 9 have an inwardly projecting rib 24. Retailing profiles 20 have two corresponding grooves 25 arranged to receive inwardly projecting ribs 24, thereby laterally securing the plate member between two upright members, for example in a snap fit manner. It should be understood that other sets of reciprocal shapes for the container guiding plates 9 and retaining profiles 20 could be employed that provide a secure engagement, provided that the retaining profiles 20 may easily attach to the upright members between adjacent container guiding plates.

As illustrated in FIG. 9, plate segment 18, at least in the embodiment where the plate member is a bracing plate member 16, comprises a lower flange 26. Lower flange 26 is equipped with a plurality of bolt holes 28, through which bolts 30 may be used to secure the bracing plate member to a floor 32 upon which the framework structure rests. Other attachment means could also be employed. As will be discussed in connection with another embodiment of the invention below, the plate members may in some uses have a function other than or in addition to providing stability to the framework structure. Plate members with such additional or different function are herein referred to as "functional" plate members. In some embodiments it may not be necessary to bolt the functional plate members to the floor or to the framework structure.

The installation of the plate system is now described. It should be understood that the order of the following steps may be rearranged.

The plate system is installed by attaching two retaining profiles 20 to two adjacent upright members 102 at the lowest level of the framework structure. The retaining profiles 20 are connected to upright members 102 by inserting the retaining profiles between guide plates 9, which is possible due to the relative flexibility of guide plates 9. In one embodiment, guide plates 9 have ribs that snap into corresponding grooves in the retaining profiles.

As shown in FIG. 11, a plate segment is then connected to the retaining profiles 20 by bolts 30 through predrilled alignment holes in flange 21. The preinstallation of the retaining profiles, together with flange 21, provides easy access to attach the plate segment. The plate segment is then bolted to the floor through predrilled holes in a lower flange part 26.

Figure 12A:
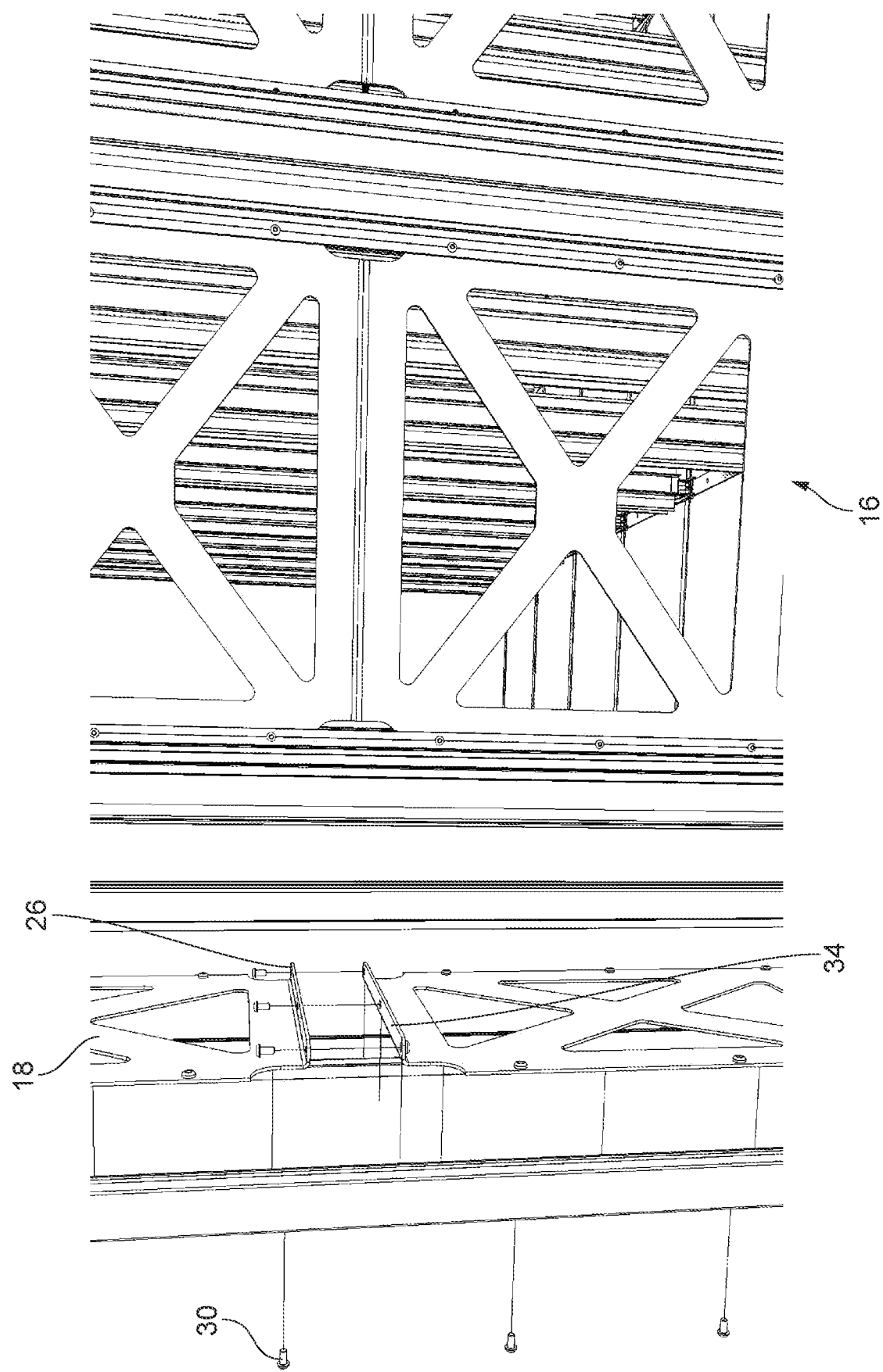
FIGS. 12A-12C are exploded views illustrating the attachments from FIGS. 10 and 11.
Figure 12B:
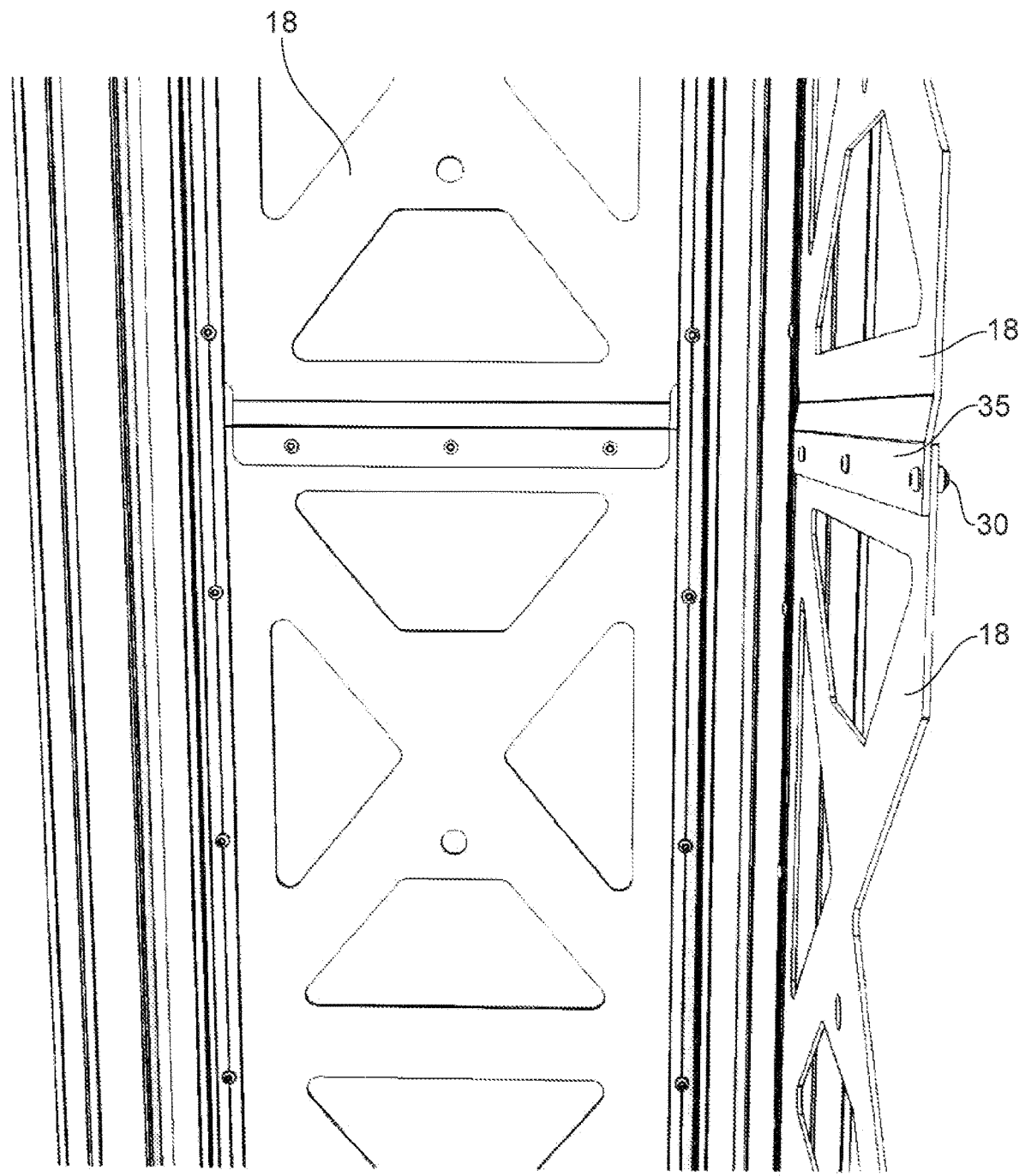
Figure 12C:
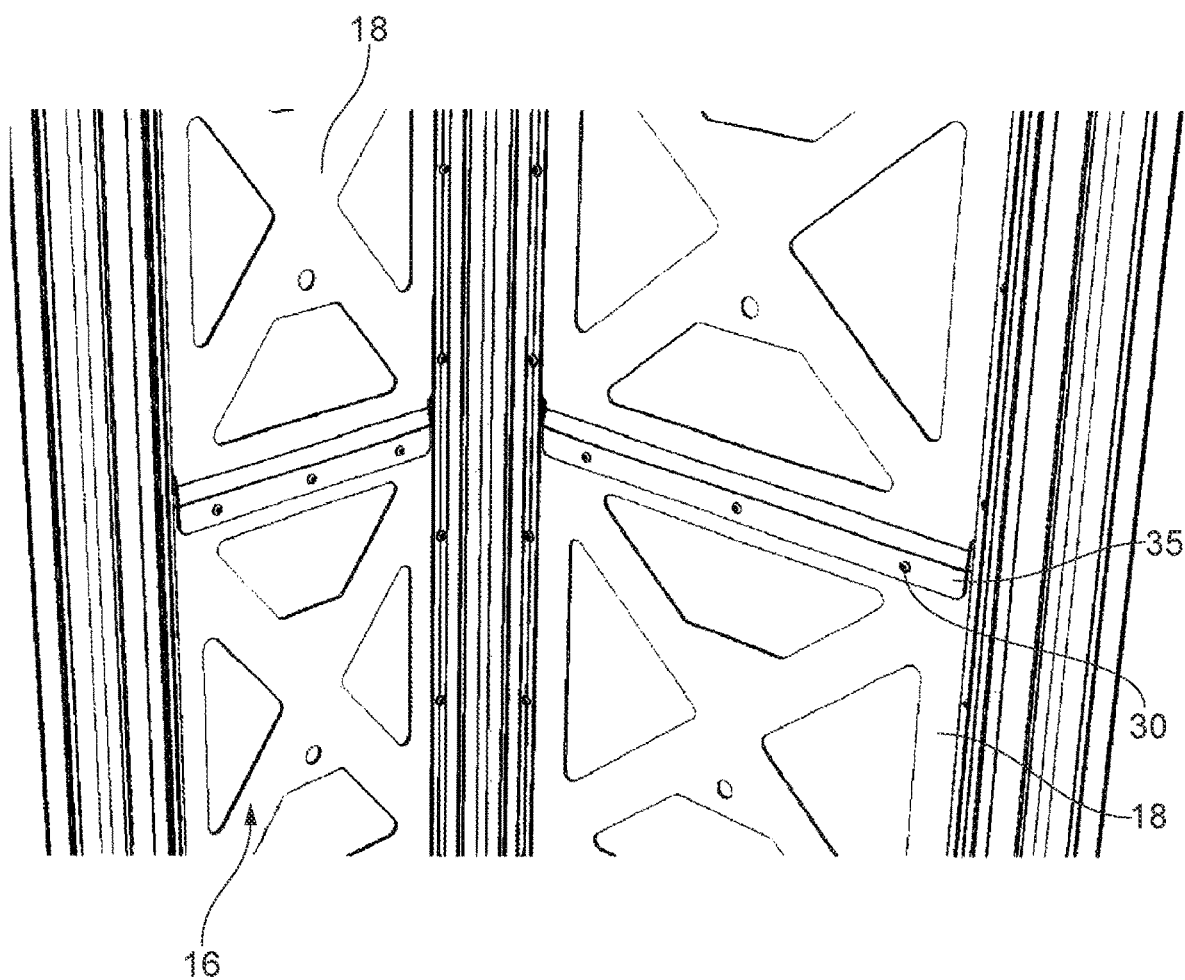

A next highest plate member is then installed above the first installed plate member. In the case of a bracing arrangement the vertically adjacent plate members are preferably bolted together. FIG. 12A, and FIGS. 12B and 12C illustrate alternate embodiments for connecting the vertically adjacent plate members.

Figure 10:
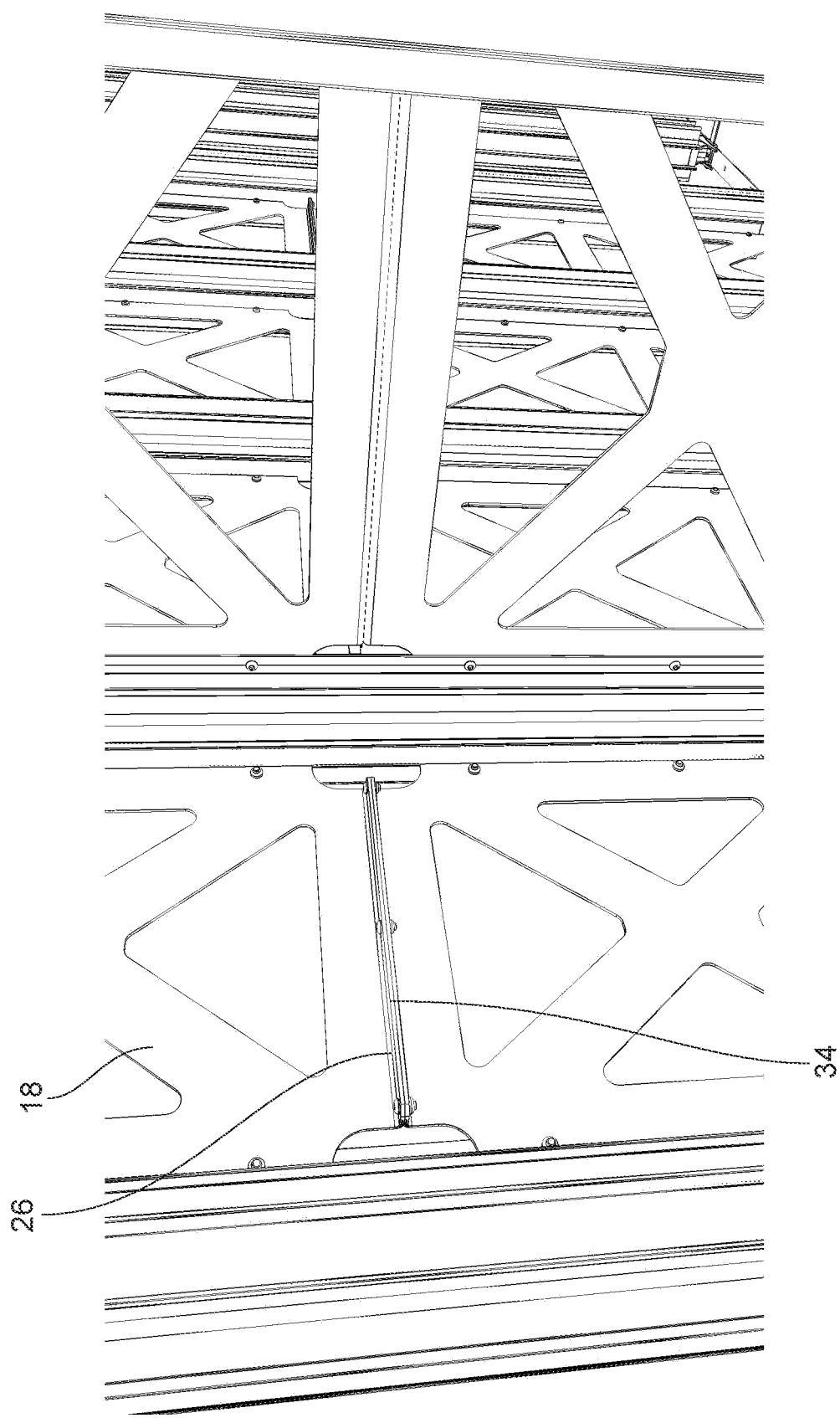
FIG. 10 is a perspective view showing vertically-adjacent bracing plate members attached to each other along their upper and lower edges.

As shown in FIG. 12A, plate segments 18 in one embodiment are equipped with a lower flange 26 and an upper flange 34 that project at about 90 degrees. Vertically adjacent plate segments can thus be bolted together as shown in FIGS. 10 and 12 through predrilled, alignment holes. In an alternate embodiment shown in FIGS. 12B and C, plate segment 18 has an offset lip 35 arranged to overlap the adjacent plate segment 18.

Figure 13A:
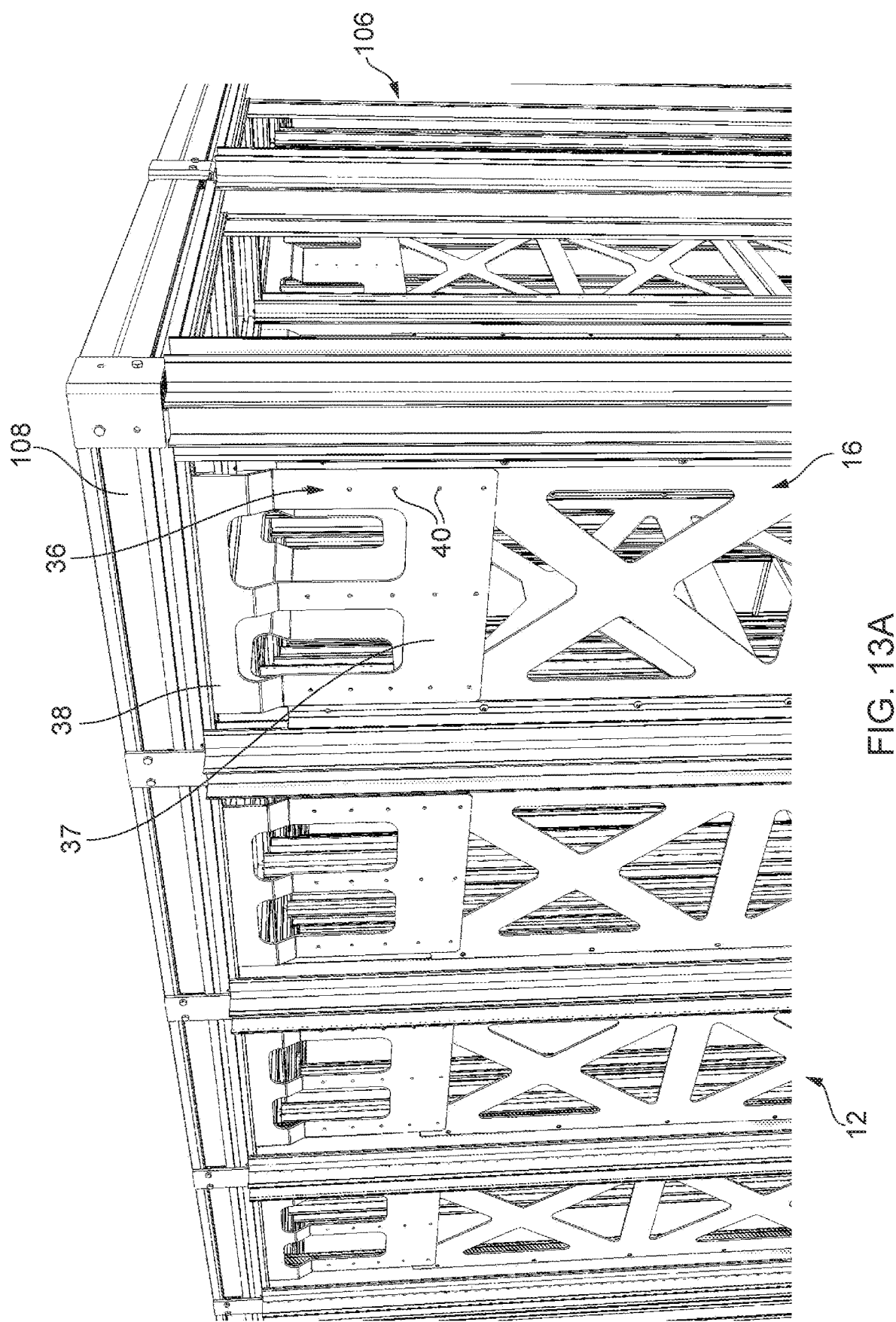
FIGS. 13a and 13b are perspective views showing rail interface plate for connecting the modular plate system to the rail system upon which storage container vehicles travel.
Figure 13B:
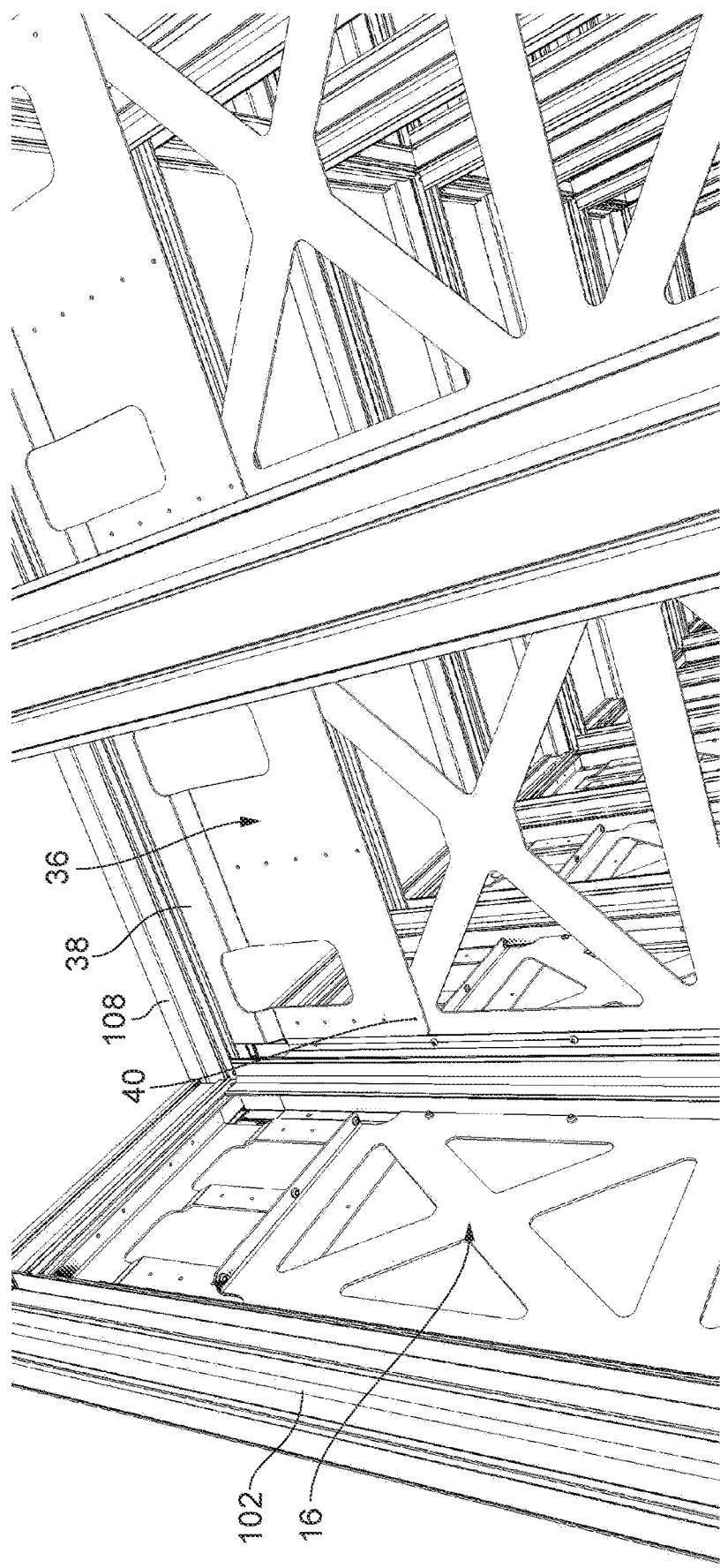

In order to attach the modular plate system 12 to the upper rail system 108 of the framework 100, at least in the case where the plate system has a stabilizing function, a rail interface plate 36 is provided as shown in FIGS. 13A and B. Rail interface plate 36 has an offset upper portion 38 arranged to engage with and be connected to rail system 108 and a lower part 37 arranged to overlap the uppermost plate member 16. Self boring screws 40 are used to secure the lower part 37 of interface plate 36 to the uppermost plate member 16 rather than employing predrilled holes, since misalignment or height differences would often prevent the upper holes from aligning properly. The self boring screws allow any height difference or other misalignment of the framework structure to be accounted for by the interface plates. As discussed below, in the case where the plate members 14 have a function which does not have to provide stabilization, it may not be necessary to secure the modular plate system 12 to the rail system 108.

As can be appreciated by FIGS. 5-13, the present invention according to one aspect provides a method for stabilizing the framework structure of an automated storage and retrieval system. According to the method, a plurality of bracing plate members 16 are installed, comprising plate segments 18 attached between two retaining profiles 20. Retaining profiles 20 are inserted between guide plates 9 of adjacent upright members 102 of an assembled framework structure 100 and plate segment 18 bolted to the retaining profiles. The lowermost bracing plate member is attached to floor 32 of the framework structure, and vertically adjacent bracing plate members are bolted together as shown in FIGS. 12A-C. At the uppermost level, rail interface plates 36 connect the plate system to rail system 108 with rail interface plates 36 and self boring screws 40 used to compensate for any misalignment of the framework structure.

Figure 14:
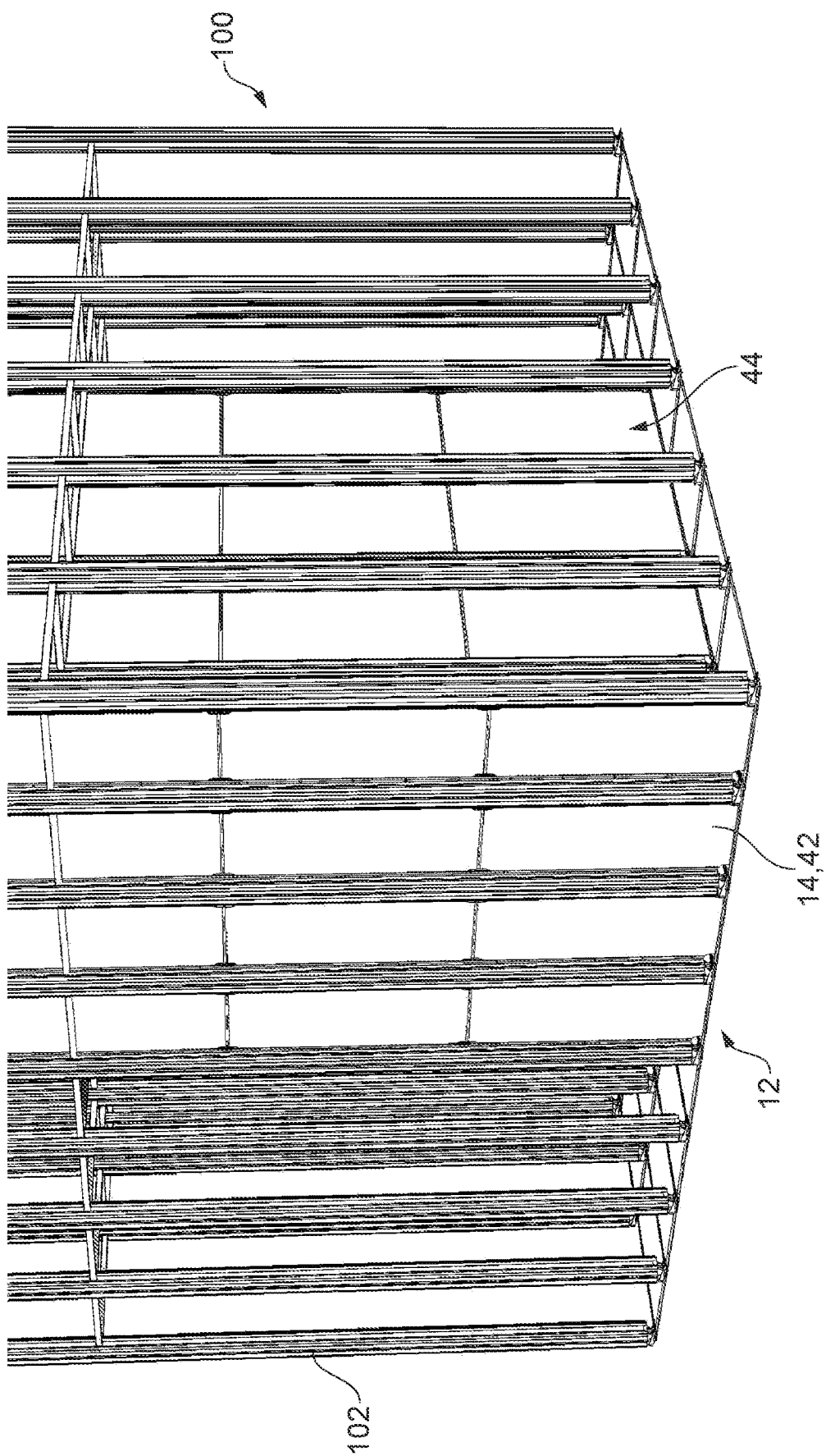
FIG. 14 is a perspective view of a preferred embodiment of the invention where the plate members of the modular plate system are functional plate members, for example, fire barrier plates, insulated plates and the like for forming functional zones in a framework structure of an automated storage and retrieval system.

FIG. 14 illustrates an embodiment of the modular plate system 12 where the plate members 14 are functional plate members 42, defined as plate members having a function other than or in addition to a stabilizing function. For example, the functional plate members 42 may be insulated plates having the function of creating a refrigerated zone in the storage and retrieval system. The functional plate members 42 may also be fire retardant plates having the function of creating a fire barrier. In this embodiment the plate segment 18 is made of or comprises a material appropriate for the given function, and attached between retaining profiles 20 as described above.

According to one aspect, the invention therefore provides a method of creating a functional zone 44 in a storage and retrieval system, by providing a plurality of functional plate segments 18 to form, together with retaining profiles 20, a plurality of functional plate members 42. The functional plate members 42 may be retrofitted to an existing storage structure, for example, in order to provide some new functionality or to reconfigure some previously installed functionality. A sufficient number of functional plate members 42 are installed between upright members 102 as described above in order to form the desired size and shape of the functional zone 44. Functional zone 44 may be, for example, an insulated zone, a refrigerated zone, a fire barrier or zone, a sound proof zone or any zone that may be defined by the functional nature of the plate members.

Since the functional plate members may not always perform a stabilizing function it may not be necessary to bolt the functional plate members 42 together and/or to the framework structure or floor as described above in all situations, although it should be understood that the functional plate members could also simultaneously have a stabilizing function, in which case bolting would be preferred. Because the functional plate members may be easily inserted into place, functional zones may be created, removed, resized and repurposed at will even in an operational storage system by programming the storage vehicles to avoid the area being created, resized or repurposed.

LIST OF REFERENCE NUMBERS

Prior Art (FIGS. 1-4):
1 Prior art automated storage and retrieval system
100 Framework structure
102 Upright members of framework structure
103 Horizontal members of framework structure
104 Storage grid
105 Storage column 106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
500 Control system
X First direction
Y Second direction
Z Third direction
8 Corner section
9 Container guiding plate
11 Corner of a storage container
12 Modular plate system
14 Plate members
16 Bracing Plate member
18 plate segment
20 Retaining profiles
21 Flange
22 cutouts
24 inwardly projecting rib
25 groove
26 lower flange
28 bolt holes
30 bolts
32 floor
34 upper flange
36 Rail interface plate
37 Lower part of interface plate
38 offset upper portion of interface plate
40 self boring screws
42 functional plate member
44 Functional zone

The invention claimed is:

1. An automated storage and retrieval system comprising:
a framework structure constructed of a plurality of upright members connected by horizontal members to define a storage grid of storage columns, the storage columns configured to stack within them a plurality of storage containers,
the framework structure having a rail system arranged at an upper level of the framework structure, with parallel rails in a first direction and parallel rails in a second direction perpendicular to the first direction, upon which a plurality of wheeled container handling vehicles are configured to travel,
the container handling vehicles are equipped with a gripping and lifting device for removing storage containers from the storage columns and replacing the storage containers in the storage columns,
wherein the upright members of the framework structure have corner sections directed towards an interior of a particular storage column, the corner sections comprising two vertically elongated, perpendicular corner guiding plates, the corner guiding plates of the upright members proximate to a storage column form a guide for corners of the storage containers in that storage column, and
a bracing system comprising:
a. a plurality of bracing plate members mounted between adjacent upright members,
b. the bracing plate members comprising a plate segment removably mounted between two retaining profiles, each retaining profile having a shape adapted to engage an upright member, wherein the retaining profiles of the bracing plate members have a box shape adapted to be securely inserted between and essentially occupy a space between the corner guiding plates of two adjacent corner sections of an upright member,
c. wherein a plate segment of the bracing plate members is arranged to be connected to a flange of the inserted retaining profiles,
d. wherein the bracing plate members are arranged to provide structural stability for the framework structure,
e. and wherein the corner guiding plates have inwardly projecting ribs that engage corresponding grooves of the retaining profiles by snap fit.

2. An automated storage and retrieval system according to claim 1, wherein the bracing plate members comprise an X-shaped plate segment connected between two retaining profiles.

3. An automated storage and retrieval system according to claim 1, wherein vertically adjacent bracing plate members are fastened together, and a lowermost bracing plate member is fastened to a floor upon which rests the framework structure.

4. An automated storage and retrieval system according to claim 3, wherein the vertically adjacent bracing plate members are fastened together by bolts.

5. An automated storage and retrieval system according to claim 1, wherein the plate segments have lower and upper flanges, and where the upper and lower flanges of vertically adjacent plate segments are fastened together.

6. An automated storage and retrieval system according to claim 1, wherein the bracing plate members have a lower offset lip portion arranged to overlap a vertically adjacent bracing plate member and be fastened together.

7. An automated storage and retrieval system according to claim 1, wherein the bracing system comprises a plurality of rail interface plates adapted to secure the bracing system to the rail system of the framework structure, said rail interface plates having a lower part arranged to overlap an uppermost bracing plate member, and be connected thereto with self boring screws.

8. A method of stabilizing a framework structure of an automated storage and retrieval system as described in claim 1, comprising:
a. providing the plurality of bracing plate members comprising two retaining profiles and a plate segment removably connected therebetween;
b. installing two of the retaining profiles between two of the adjacent upright members at a lowermost level of the framework,
c. connecting the plate segment to the two installed retaining profiles;

d. installing additional of the plurality of bracing plate members above the installed bracing plate member to a desired height along the corresponding storage column; and e. arranging the plurality of bracing plate members in a desired number and pattern to stabilize the framework.

9. The method according to claim 8, wherein the retaining profiles and the upright members have reciprocal shapes permitting a snap fit between the retaining profiles and the upright members.

10. A method of creating a functional zone in a framework structure of an automated storage and retrieval system as described in claim 1, comprising:

a. providing the plurality of bracing plate members comprising two retaining profiles and a plate segment removably connected therebetween;

b. installing a first bracing plate member of the plurality of bracing plate members by connecting two of the retaining profiles between two of the adjacent upright members at a lowermost level of the framework and connecting the plate segment to the two installed retaining profiles;

c. installing additional of the plurality of bracing plate members above the first bracing plate member to a desired height along the corresponding storage column; and d. arranging the plurality of bracing plate members in a desired number and pattern to create a desired functional zone.

11. The method according to claim 10, wherein the plurality of functional plate members are installed in a construction area of the framework structure while the storage and retrieval system is in operation.

* * * * *